(12) United States Patent
Kinneberg et al.

(10) Patent No.: US 8,515,350 B2
(45) Date of Patent: Aug. 20, 2013

(54) RESOLVING AN APPLICATION SERVICE CHANGE IN A SYSTEM USING BLUETOOTH

(75) Inventors: Steven J. Kinneberg, Bellevue, WA (US); Jack H. Profit, Vashon, WA (US); Gregory Burns, Seattle, WA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 368 days.

(21) Appl. No.: 13/083,890

(22) Filed: Apr. 11, 2011

(65) Prior Publication Data

US 2012/0258664 A1 Oct. 11, 2012

(51) Int. Cl.
*H04B 7/24* (2006.01)
*H04B 7/00* (2006.01)
*H04B 7/212* (2006.01)

(52) U.S. Cl.
USPC ............................. 455/41.2; 455/39; 370/324

(58) Field of Classification Search
USPC ................ 455/39, 41.2, 507, 552.1; 370/324
See application file for complete search history.

(56) References Cited

U.S. PATENT DOCUMENTS

| | | | | |
|---|---|---|---|---|
| 7,558,903 B2 * | 7/2009 | Kinstler | | 710/315 |
| 8,108,455 B2 * | 1/2012 | Yeager et al. | | 709/202 |
| 8,108,519 B2 * | 1/2012 | Zhang et al. | | 709/225 |
| 2002/0031107 A1 * | 3/2002 | Li et al. | | 370/338 |
| 2008/0225778 A1 * | 9/2008 | Vare et al. | | 370/328 |
| 2011/0085530 A1 * | 4/2011 | Hellhake et al. | | 370/338 |
| 2012/0120833 A1 * | 5/2012 | Fraccalvieri et al. | | 370/252 |
| 2012/0265871 A1 * | 10/2012 | Dowell | | 709/224 |

* cited by examiner

*Primary Examiner* — Andrew Wendell
(74) *Attorney, Agent, or Firm* — Neugeboren O'Dowd PC

(57) ABSTRACT

Peer-to-peer communication is established between applications in different Bluetooth enabled devices in a Bluetooth network by using Bluetooth protocol messages to discover peer-to-peer bus daemons. In the Bluetooth enabled computing devices, an initiating peer-to-peer bus daemon initiating a connection from a first device to a second device discovers an accepting peer-to-peer bus daemon at the second device. After the discovery of the accepting peer-to-peer bus daemon by the initiating peer-to-peer bus daemon, the initiating peer-to-peer bus daemon sends SDP protocol messages to find a named application available through the accepting peer-to-peer bus daemon. An extended inquiry response with a unique identifier is created and sent by the accepting peer-to-peer bus daemon to the initiating peer-to-peer bus daemon. This unique identifier contains a revision count and the revision count indicates the current version of an application name list for application services available at the accepting peer-to-peer bus daemon.

19 Claims, 5 Drawing Sheets

RESOLVING AN APPLICATION SERVICE CHANGE IN A SYSTEM USING BLUETOOTH

TECHNICAL FIELD

This invention relates to resolving an application service change in a system using Bluetooth. More particularly the invention relates to discovering and establishing peer-to-peer communication between application services on multiple devices using Bluetooth communications.

BACKGROUND OF THE INVENTION

Peer-to-peer communication between applications on devices is a major feature in social media networking and multi-player games. Users want to be able to join a group using the same application in multiple devices connected over a proximity-based network. Accomplishing this in a Bluetooth proximity-based network presents a number of problems.

Devices equipped to use Bluetooth communication protocols to send Bluetooth messages are referred to herein as Bluetooth enabled devices. Bluetooth enabled devices have a Bluetooth communication layer to open communications to exchange Bluetooth messages with each other. Not all Bluetooth enabled devices have bus daemons capable of peer-to-peer communication. After communications are open, a Bluetooth enabled device having a peer-to-peer bus daemon can discover whether a second Bluetooth enabled device has a peer-to-peer bus daemon. If a user is looking for peer-to-peer communication, and the second Bluetooth enabled device does not have a peer-to-peer bus daemon, the Bluetooth process to open communications between devices is wasted effort. Further, the quantity of Bluetooth enabled devices within RF range can be very large at social networking locations such as coffee houses, for example. Accordingly, connecting Bluetooth enabled devices that do not have peer-to-peer bus daemons wastes a lot of computing time.

After Bluetooth enabled devices having peer-to-peer bus daemons are connected, there is another layer of discovering that is required. This additional discovery layer identifies applications available for peer-to-peer communications between two Bluetooth enabled devices. A Bluetooth service discovery protocol (SDP) process, that discovers available applications, is performed each time Bluetooth enabled devices connect to perform peer-to-peer communication. This can be very burdensome to the Bluetooth enabled devices.

It is with respect to these considerations and others that the present invention has been made.

SUMMARY OF THE INVENTION

In accordance with embodiments of the present invention, establishing peer-to-peer communication between applications in different Bluetooth enabled devices in a Bluetooth proximity-based network is accomplished first by using Bluetooth protocol messages to discover peer-to-peer bus daemons, i.e., bus daemons capable of peer-to-peer communication. In the Bluetooth enabled devices, an initiating peer-to-peer bus daemon initiating a connection from a first device to a second device discovers an accepting peer-to-peer bus daemon accepting the connection at the second device. After the discovery of initiating and accepting peer-to-peer bus daemons, the initiating peer-to-peer bus daemon sends SDP protocol messages to find a named application available through the accepting peer-to-peer bus daemon. An extended inquiry response with a unique identifier is created and sent by the accepting peer-to-peer bus daemon to the initiating peer-to-peer bus daemon. This unique identifier contains a revision count and the revision count indicates the current version of an application name list for application services available at the accepting peer-to-peer bus daemon. The initiating peer-to-peer bus daemon receiving the unique identifier with revision count compares the revision count with a stored revision count from previous peer-to-peer communications with the accepting peer-to-peer bus daemon. If the revision counts are the same, the initiating peer-to-peer bus daemon knows it has a current version of the application name list in its cache. If the revision counts are not the same, the initiating peer-to-peer bus daemon uses an SDP query to find names of applications now available at the accepting peer-to-peer bus daemon.

In accordance with other aspects, embodiments of the present invention relate to apparatus for discovering application services available on the Bluetooth enabled devices in a network of Bluetooth enabled devices within radio frequency range of each other. A peer-to-peer bus daemon exchanges Bluetooth messages with other bus daemons in other Bluetooth enabled devices in the network to discover other peer-to-peer bus daemons. The peer-to-peer bus daemons compare version numbers of application service lists available currently at a bus daemon to version numbers cached for the same bus daemon during previous peer-to-peer communications. Service discovery modules associated with the peer-to-peer bus daemons responsive to the version numbers being different exchange Bluetooth SDP messages with one another to discover application services available at the peer-to-peer bus daemons. A same-name test module detects a name match between same-named applications available at different peer-to-peer bus daemons. An establish module opens peer-to-peer communications between same-named applications through peer-to-peer bus daemons on separate Bluetooth enabled devices when the same-name test module detects a name match or when the version numbers are the same.

In accordance with still other aspects, embodiments of the present invention relate to a method of establishing peer-to-peer communication between applications in Bluetooth enabled devices in a Bluetooth network. The method begins by discovering peer-to-peer bus daemons in Bluetooth enabled devices and by discovering application services available at peer-to-peer bus daemons. The method continues by detecting a name match between same-named application services available at different peer-to-peer bus daemons and by opening peer-to-peer communications between same-named applications through peer-to-peer bus daemons on separate Bluetooth enabled devices.

In another aspect of the invention, the method continues by sending an extended inquiry response (EIR) containing an identifier for an accepting peer-to-peer bus daemon and a revision count indicating the version of a name list of applications available through the accepting peer-to-peer bus daemon. The method continues by detecting at an initiating peer-to-peer bus daemon whether a revision count received in an EIR message is the same as a revision count stored at the initiating peer-to-peer bus daemon and by discovering application services available at the accepting peer-to-peer bus daemon if the revision counts do not match. However if the revision counts do match, the method skips directly to opening peer-to-peer communications between same-named applications through the initiating and accepting bus daemons.

These and various other features as well as advantages, which characterize the present invention, will be apparent from a reading of the following detailed description and a review of the associated drawings.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings where like or similar elements are designated with identical reference numerals throughout the several views and wherein:

DETAILED DESCRIPTION

Several embodiments of the present invention enable a device that is capable of participating in one or more ad-hoc networks to more quickly initiate communications with other devices that also participate in ad-hoc networks.

Figure 1:
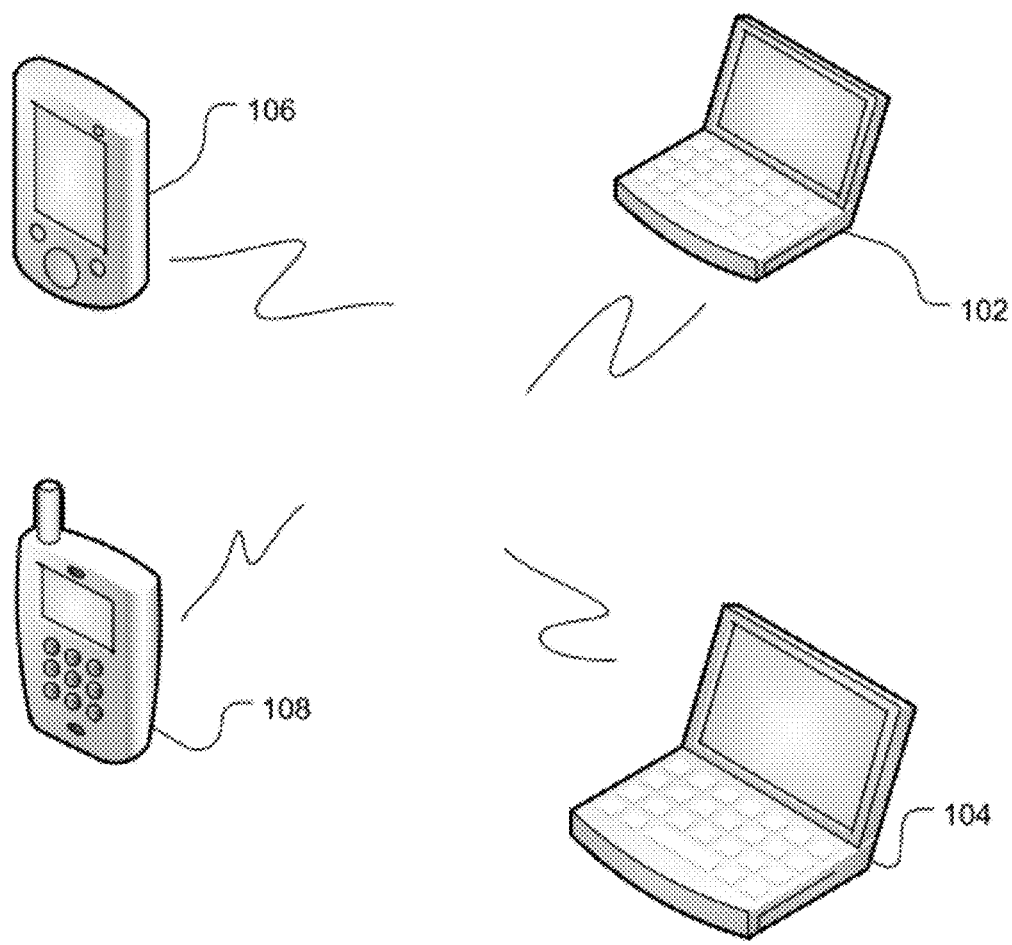
FIG. 1 shows a plurality of Bluetooth enabled devices communicating in a proximity-based network in accordance with various embodiments of the invention.

Referring first to FIG. 1, it shows four Bluetooth enabled computing devices, i.e., a laptop computer 102, a tablet computer 104, an application phone 106, and a smart phone 108, in RF (radio frequency) range for Bluetooth communications. All four Bluetooth enabled computing devices (also referred to herein as devices) can converse with each other through their internal Bluetooth transceivers. Devices as used herein refers to computers, laptop computers, notebook computers, tablet computers with touch screen input, smart phones, application phones with keyboards or touch screens (app phones) and any other intelligent, computing-system device.

Figure 2:
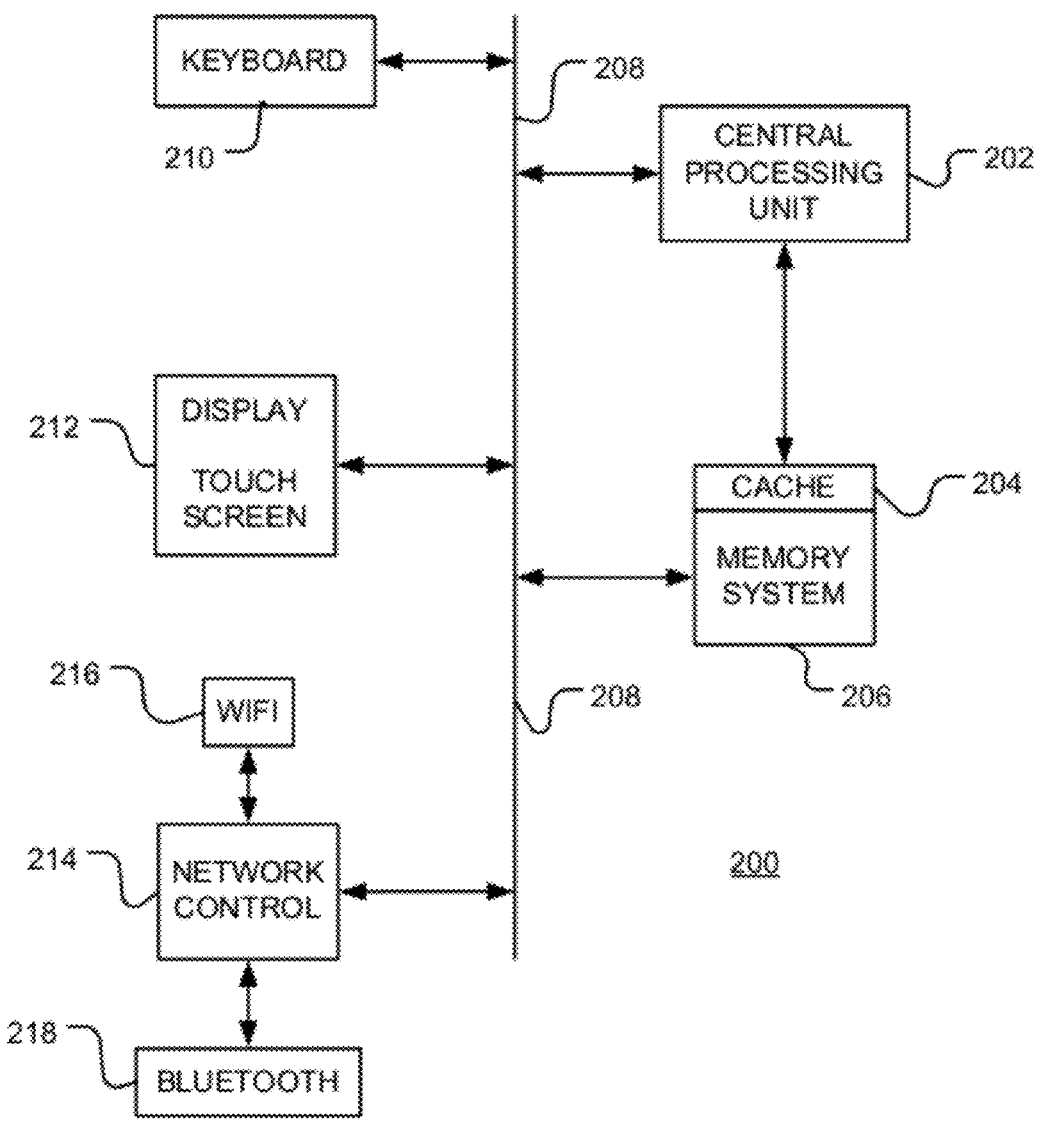
FIG. 2 shows an exemplary Bluetooth enabled system for performing operations in accordance with various embodiments of the invention.

FIG. 2 is an exemplary Bluetooth enabled computing device 200 representative of any type of mobile computer, laptop computer, notebook computer, tablet computer, smart phone, app phone, or intelligent computing device that might be used to join a proximity-based Bluetooth group. Central processing unit (CPU) 202 is the main processing unit executing computer processes. CPU 202 works with cache memory 204 in memory system 206 as well as program storage, file storage and working storage also contained in memory system 206. Cache memory 204 is usually directly linked to CPU 202, while remaining storage in the memory system 206 may be accessed through bus 208.

Keyboard module 210 is one input device available to CPU 202 through bus 208. Another input device is a touch screen in display 212. Display 212 with its touch screen serves as both an output device displaying information to a user and an input device receiving input from the user via the touch screen. Display 212 is connected to CPU 202 over bus 208.

Network control module 214 connects to CPU 202 to perform network control operations to connect the computing device 200 to a wireless network via WIFI transceiver 216 or to a Bluetooth transceiver 218. Network control module 214 may be an intelligent module with its own device and memory including a cache. Alternatively, it may be implemented as firmware or software running on CPU 202. Likewise the keyboard 210, display 212, and memory system 206 may all be intelligent subsystems communicating over bus 208. One skilled in the art is well aware, in view of the present disclosure, of the many variations possible in designing a device performing the operations of various embodiments of the present invention.

A computing device, such as computing device 200, typically includes at least some form of computer-readable media. Computer readable media can be any available media that can be accessed by the device 200. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the device 200.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

Figure 3:
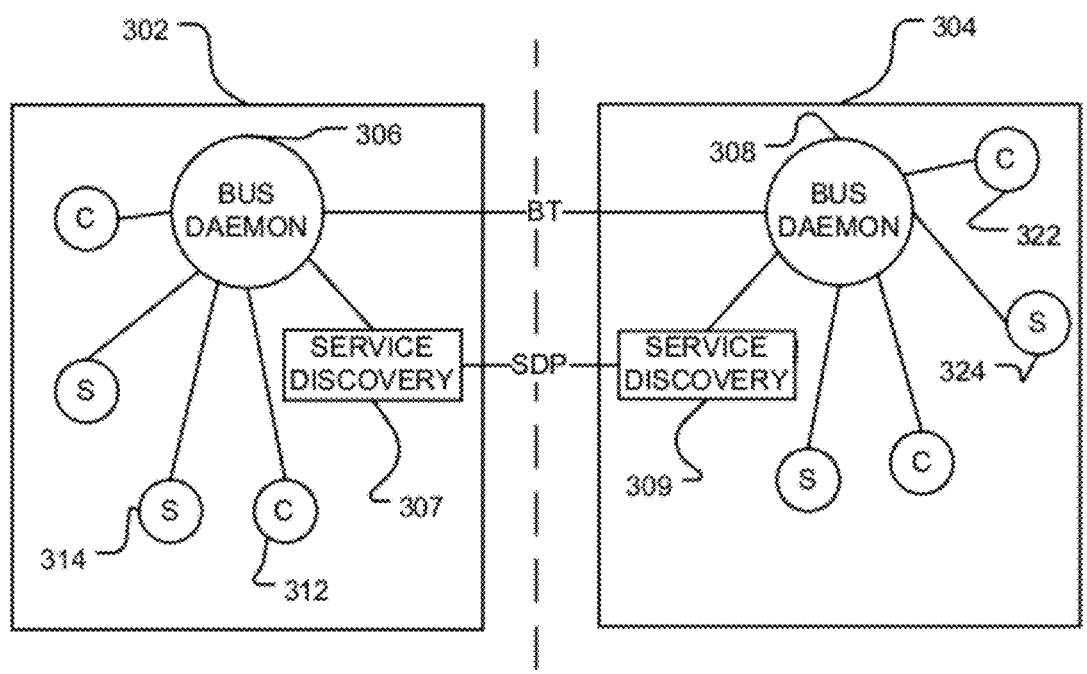
FIG. 3 shows two Bluetooth enabled devices from the proximity-based network in FIG. 1 with peer-to-peer bus daemons establishing peer-to-peer communication between applications in the Bluetooth enabled devices.

FIG. 3 illustrates client and server applications working with peer-to-peer bus daemons to establish Bluetooth communications between applications on two Bluetooth enabled devices 302 and 304 in a RF network such as the network shown in FIG. 1. Each of the peer-to-peer bus daemons 306, 308 discovers that the other of the peer-to-peer bus daemons 306, 308 is enabled for peer-to-peer communication by using Bluetooth messages. In the initial handshake to open Bluetooth communications, a typical Bluetooth enabled device that is not capable of peer-to-peer communication will not respond to a message from a Bluetooth enabled device seeking to discover a peer-to-peer bus daemon. This prevents time wasting connections between two Bluetooth enabled devices that are not capable of peer-to-peer communication.

After the peer-to-peer bus daemons 306, 308 have discovered each other, they will establish peer-to-peer communication between their application clients 312, 322 and servers 314, 324 using Bluetooth SDP messages to discover same-named applications. Service discovery module 307 works in connection with peer-to-peer bus daemon 306 to process the SDP messages from peer-to-peer bus daemon 308 during the application discovery phase. Likewise service discovery module 309 works with a same-name test module and peer-to-peer bus daemon 308 to process the SDP messages from peer-to-peer bus daemon 306 during the application discovery phase.

After the peer-to-peer bus daemons 306, 308 have established peer-to-peer communications, the peer-to-peer bus daemons 306, 308 are said to be joined. Now clients 312, 322 for an application in one Bluetooth enabled device 302, 304 may pass remote procedure calls to servers 314, 324 for the same-named application in the other one of the Bluetooth enabled devices 302, 304 using the peer-to-peer bus daemons 306, 308. For example, the server 314 in the Bluetooth enabled device 302 invokes the method called by the remote procedure call and returns the method results to the client 322 in the other Bluetooth enabled device 304.

Application programs operating both as a server offering a service and as a client making use of a service communicate with their corresponding peer-to-peer bus daemons and thereby communicate over the Bluetooth proximity-based network. For example, a Name-1 game application program in Bluetooth enabled device 302 operates as client 312 and server 314, while the same Name-1 game application program in Bluetooth enabled device 304 operates as client 322 and server 324. Now if client 312 wishes to execute a remote procedure call at server 324, and if peer-to-peer bus daemon 306 is joined with peer-to-peer bus daemon 308, peer-to-peer bus daemon 306 will use Bluetooth protocols and messages to pass the remote procedure call to peer-to-peer bus daemon 308. Peer-to-peer bus daemon 308 in turn passes the procedure call to server 324. Likewise if client 322 in Bluetooth enabled device 304 wishes to execute a remote procedure call at server 314 in Bluetooth enabled device 302, peer-to-peer bus daemon 308 will use Bluetooth protocols and messages to pass the remote procedure call to peer-to-peer bus daemon 306. Peer-to-peer bus daemon 306 in turn passes the procedure call to server 314.

If peer-to-peer bus daemons 306 and 308 have not joined, then when the Bluetooth enabled devices 302, 304 come within RF range of each other, server 314 for example advertises the availability of Name-1 game by telling peer-to-peer bus daemon 306 to make itself discoverable. In some implementations, a mark module that is implemented in connection with the peer-to-peer bus daemon 306 saves its UUID (Universal Unique Identifier) in its SPD record and marks itself discoverable as a peer-to-peer bus daemon and creates an EIR packet containing its UUID.

When peer-to-peer bus daemon 308 receives a FIND NAME request from one of its client applications, it broadcasts a discover message to all devices within Bluetooth RF range. In this instance, peer-to-peer bus daemon 308 is acting as an initiating-bus-daemon to initiate a connection with peer-to-peer bus daemons. Any Bluetooth enabled devices (e.g., Bluetooth enable device 302) receiving the discover message and having a peer-to-peer bus daemon marked discoverable, such as peer-to-peer bus daemon 306, will reply. Bus daemon 306, acting as an accepting-bus-daemon, sends an EIR data packet. The EIR data packet contains at least the UUID of the peer-to-peer bus daemon 306 with the peer-to-peer bus daemon's identifier and a revision count. The EIR data packet may contain other UUIDs for other Bluetooth services. Not all Bluetooth services require their UUID to be included in the EIR. In this embodiment of the invention the EIR data packet contains the UUID of the peer-to-peer bus daemon 306 (acting as an accepting-bus-daemon). And a version test module in connection with the peer-to-peer bus daemon 308 (acting as an initiating bus daemon) checks the revision count in the UUID for the bus daemon 306 (acting as an accepting-bus-daemon) to determine if peer-to-peer bus daemon 308 has an up-to-date record of active applications available through peer-to-peer bus daemon 306 (acting as an accepting-bus-daemon) at device 302.

If the revision counts do not match, peer-to-peer bus daemon 308 (acting as an initiating-bus-daemon) working with service discovery module 309 (in the Bluetooth enabled device 304 acting as an initiating Bluetooth enabled device) initializes a SDP process with service discovery module 307 at peer-to-peer bus daemon 306 (acting as an accepting-bus-daemon in the Bluetooth enabled device 302 acting as an accepting Bluetooth enabled device). The SDP service discovery modules 307 and 309 working with peer-to-peer bus daemons 306 and 308, respectively, proceed through an SDP process exchanging queries to retrieve the list of application names available through peer-to-peer bus daemon 306 (acting as accepting bus daemon). Peer-to-peer bus daemon 308 (acting as an initiating-bus-daemon) checks the name list to see if there is a name match with the name of the application that peer-to-peer bus daemon 308 is searching for. If there is a name match, peer-to-peer bus daemon 308 notifies its client (e.g. client 322) that it found the named application, e.g. Name-1 game, and updates its name list of applications available from peer-to-peer bus daemon 306 (acting as an accepting-bus-daemon). If the client (e.g. client 322) wishes the peer-to-peer bus daemons 306 and 308 to join, the peer-to-peer bus daemons 306 and 308 connect and establish Bluetooth peer-to-peer communication between the Name-1 applications in Bluetooth enabled devices 302 and 304.

In the event the peer-to-peer communication is closed at some point and the users later wish to resume the communication, the revision count test is used to possibly shorten the process of re-establishing communication. In many modes of operation for example, the SDP application discovery process is by-passed if present and previous revision counts match. To reopen communication for example, peer-to-peer bus daemons 306 and 308 perform the initial discovery phase to discover peer-to-peer bus daemon 306 and get the EIR packet containing the UUID for peer-to-peer bus daemon 306. Once the UUID is retrieved for peer-to-peer bus daemon 306, peer-to-peer bus daemon 308 will check to see if the revision count in the newly retrieved UUID matches the revision count it has previously stored for the peer-to-peer bus daemon 306. If there is a match, it knows the same applications are still available and peer-to-peer bus daemon 308 proceeds to re-establish peer-to-peer communication using Bluetooth communication protocols.

Figure 4:
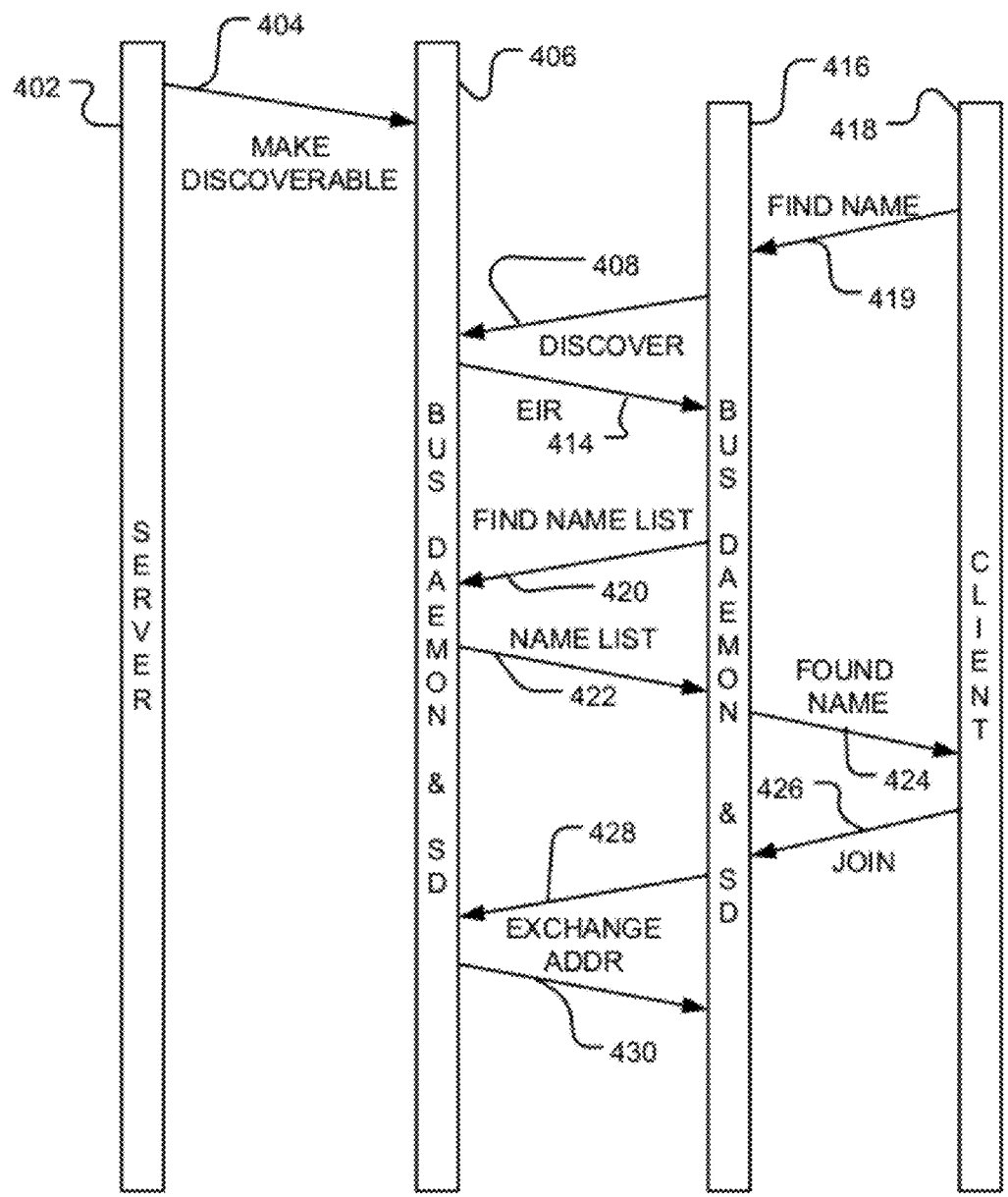
FIG. 4 illustrates a conversation between the peer-to-peer bus daemons of FIG. 3.

FIG. 4 illustrates an exemplary discovery conversation between peer-to-peer bus daemons 406, 416 with their service discovery modules in Bluetooth enabled devices such as those shown in FIG. 3. Although each of the peer-to-peer bus daemons 406, 416 may be capable of operating as both accepting-type and initiating-type bus daemons, for clarity in the following discussion about an exemplary exchange of communication, the peer-to-peer bus daemon 406 is frequently referred to herein as an accepting bus daemon 406 and the peer-to-peer bus daemon 416 is frequently referred to herein as an initiating bus daemon 416.

In preparation for a discovery conversation, server 402 sends a make-discoverable message 404 to accepting bus daemon 406 requesting that the accepting bus daemon 406 make itself available to other peer-to-peer bus daemons and make Name-1 application discoverable. Accepting bus daemon 406 adds a Universal Unique Identifier (UUID) for the accepting bus daemon 406 to the peer-to-peer bus daemon's SPD record. The accepting bus daemon 406 turns on its Bluetooth discoverability, e.g., a marker effectively announcing, "I am a peer-to-peer bus daemon." Also accepting bus daemon 406 creates an extended inquiry response (EIR) packet. The EIR packet contains a set of UUIDs and each UUID is a 128 bit record. The UUID in one embodiment of this invention is split into 2 parts: a 96 bit UUID base number for the peer-to-peer bus daemon and a 32 bit revision count. For example the Bluetooth service for a peer-to-peer bus daemon uses the 128 bit record, XXXXXXXX-YYYY-YYYY-YYYY-YYYYYYYYYYYY where XXXXXXXX is the 32 bit value for the revision count, and YYYY-YYYY-YYYY-YYYYYYYYYYYY is the 96 bit UUID base number used to identify the peer-to-peer bus daemon.

The revision count is initiated as a random number. With 32 bits used for the revision count, the random number is one value out of four billion. By using a large random number the likelihood of two peer-to-peer bus daemons having the same revision count is negligible, and it is not necessary to manage the revision counts to avoid duplication. The revision count is used as a version number for an application name list managed by service discovery module (e.g. service discovery module 307 in FIG. 3) of accepting bus daemon 406. Whenever accepting bus daemon 406 adds or removes an application on the application name list, the revision count in one embodiment is incremented by one to indicate the list of applications has changed. Alternatively in another embodiment, some other mathematical function might be used to change the revision count. The 96 bit UUID base number is a previously agreed upon number used by the peer-to-peer bus daemons to identify each other. In operation, a version test module (operating in connection with a bus daemon and service discovery module) in the initiating device (e.g., Bluetooth enabled device 304) is configured to compare a current version number of an application name list that is currently available from a particular remote peer-to-peer bus daemon (e.g., peer-to-peer bus daemon 406) residing on a particular remote Bluetooth-enabled device (e.g., Bluetooth enable device 302) with a locally-stored cached version number received from the particular remote peer-to-peer bus daemon during a previous peer-to-peer communication.

In FIG. 4, initiating bus daemon 416 is in a remote Bluetooth enabled device from the Bluetooth enabled device using accepting bus daemon 406 (e.g., the initiating bus daemon 416 is within a separate device from the accepting bus daemon but within Bluetooth transmission range). Client 418 is requesting initiating bus daemon 416 with a FIND NAME message 419 to find an application on another device. FIND NAME message 419 identifies the name of the desired application wanted for peer-to-peer communication. Initiating bus daemon 416 responds to the FIND NAME message 419 by using a Bluetooth communication mechanism and sending a discover message 408 to find Bluetooth enabled devices having peer-to-peer bus daemons. Only peer-to-peer bus daemons will respond to this discover message. In this exchange between initiating bus daemon 416 and accepting bus daemon 406, initiating bus daemon 416 receives an EIR data packet 414 generated by accepting bus daemon 406. This EIR packet contains the UUID, identifying base number of accepting bus daemon 406 and the revision count of the application name list available through accepting bus daemon 406.

If this is a first conversation between accepting bus daemon 406 and initiating bus daemon 416, the initiating bus daemon 416 will not know what applications are available through accepting bus daemon 406. Therefore initiating bus daemon 416 through its service discovery module will use SDP query processes and send FIND NAME LIST query 420. The service discovery module associated with accepting bus daemon 406 searches for and retrieves a name list of applications available from the service discovery module's application services list. As a result, initiating bus daemon 416 receives a name list 422 of applications available through accepting bus daemon 406.

The initiating bus daemon 416 checks the name list 422 looking for the name of the application requested by client 418. If the name is on the name list 422, initiating bus daemon 416 sends a FOUND NAME message 424 to the client 418. If client 418 wants to connect with server 402 of the same application, it replies with a JOIN message 426 to initiating bus daemon 416.

Peer-to-peer bus daemons 416 and 406 then exchange Bluetooth messages 428 and 430 in order to establish bluetooth peer-to-peer communications between server 402 and client 418 through peer-to-peer bus daemons 406 and 416. The flow of logical operations performed by peer-to-peer bus daemons 406 and 416 during the conversation of FIG. 4 is described hereinafter with reference to FIG. 5.

The logical operations in the operations of the various embodiments of the present invention are implemented (1) as a sequence of computer implemented acts or program modules running on a device and/or (2) as interconnected machine logic circuits or circuit modules within the device. The implementation is a matter of choice dependent on the performance requirements of the device implementing the invention. Accordingly, the logical operations making up the various embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 5:
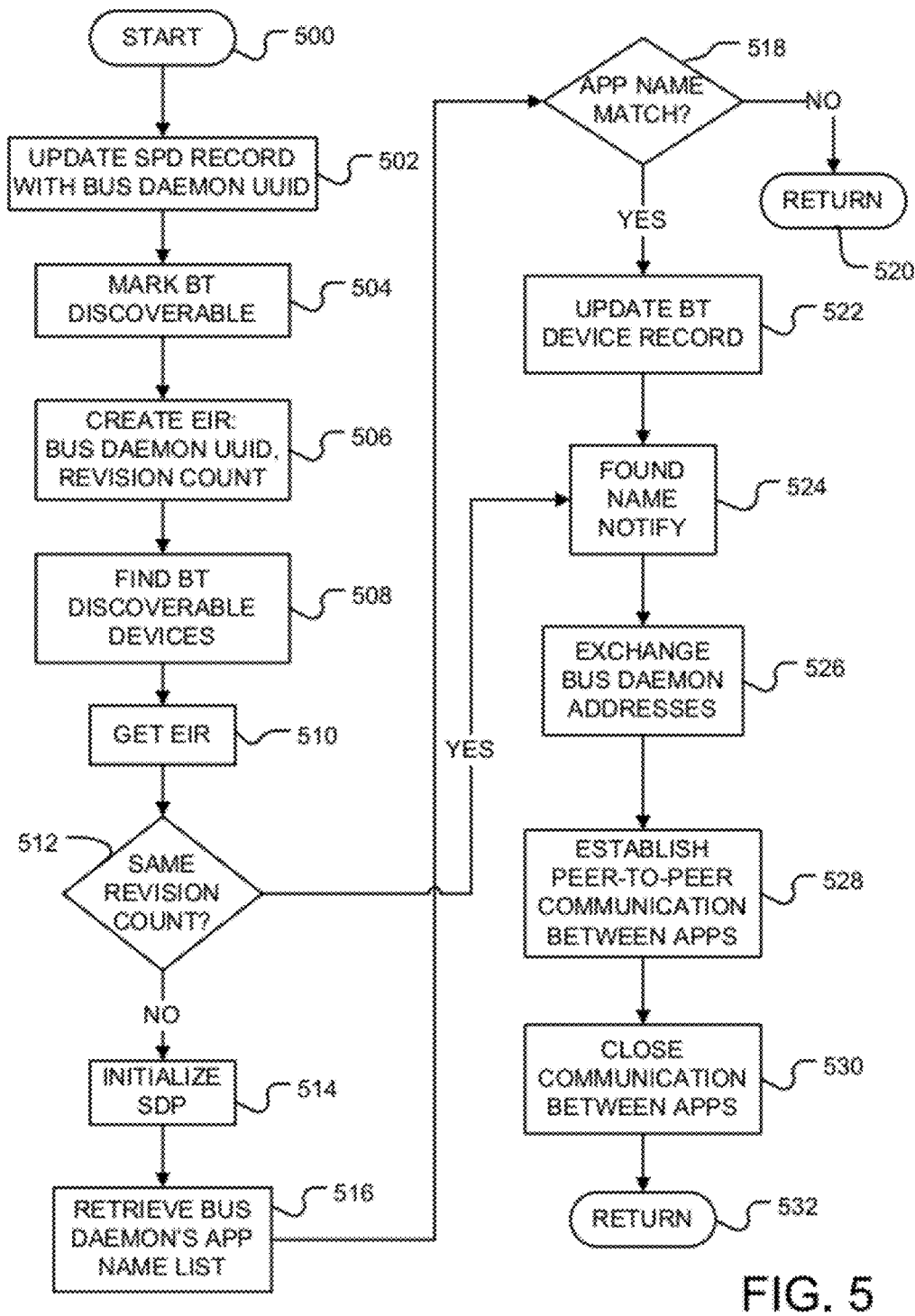
FIG. 5 shows the flow of operations performed by a peer-to-peer bus daemon in each Bluetooth enabled devices.

FIG. 5 shows the flow of operations performed by peer-to-peer bus daemons 406 and 416 during the conversation of FIG. 4 to establish peer-to-peer communication between applications. The operation flow is described with reference to operations in FIG. 5 and to peer-to-peer bus daemons and messages in FIG. 4. It begins at start connector 500 when accepting bus daemon 406 receives the make-discoverable message 404 from server application 402.

In FIG. 5 accepting bus daemon 406 performs add UUID operation 502, mark peer-to-peer (P2P) operation 504 and create EIR/UUID operation 506 in response to the make-discoverable message 404. Add UUID operation 502 adds UUID (Universal Unique Identifier) of accepting bus daemon 406 to the SPD record, which has the address of the accepting bus daemon 406 and its UUID having the defined pattern, i.e., unique identifier and revision count, for a peer-to-peer bus daemon. Mark operation 504 turns on a Bluetooth discoverability marker indicating that accepting bus daemon 406 is a peer-to-peer bus daemon. In one embodiment this marker is the correct UUID pattern for a peer-to-peer bus daemon. In an alternative embodiment it may be a marker bit or code at a predefined location in the SDP record for the peer-to-peer bus daemon.

Create EIR/UUID operation 506 creates the EIR data packet containing an address for accepting bus daemon 406 and the UUID of accepting bus daemon 406. The UUID contains the bus daemon identifier and an initial revision count. The revision count indicates the current version, or state, of an application name list available through accepting bus daemon 406.

Discover module 508 and send EIR/UUID module 510 perform a series of operations in a discovery conversation executed between peer-to-peer bus daemons 406 and 416. As discussed above in reference to FIG. 4, during the discovery conversation initiating bus daemon 416 is an initiating bus daemon acting to initiate a connection between the peer-to-peer bus daemons 406 and 416, and accepting bus daemon 406 is the accepting bus daemon acting to accept a connection between the peer-to-peer bus daemons 406 and 416. In discover module 508, initiating bus daemon 416 sends the discover message 408 to look for EIR data containing a UUID that matches the pattern for a UUID of a peer-to-peer bus daemon. If a non-peer-to-peer bus daemon receives discover message 408, it will not have a UUID with a correct pattern so it ignores the discover message and does not send a reply. Accepting bus daemon 406 has a UUID with the correct pattern for a peer-to-peer bus daemon. Accepting bus daemon 406 uses send-EIR/UUID module 510 to send its EIR data packet 414 to initiating bus daemon 416. This EIR data packet contains the address of accepting bus daemon 406 and its UUID.

In one embodiment, revision test operation 512, which is performed by the initiating bus daemon 416, detects whether the revision count in the UUID for the accepting bus daemon 406 in the conversation of FIG. 4 is the same as the revision count if any, that the initiating bus daemon 416 has previously cached for the accepting bus daemon 406. Alternatively in another embodiment, revision test operation 512 compares the address and the complete UUID just received from the accepting bus daemon 406 to an address and complete UUID previously stored for the accepting bus daemon 406 by the initiating bus daemon 416 during an earlier conversation between the bus daemons 406, 416. In either embodiment, if a match is found, the operation flow branches YES to notify operation 524. In either embodiment if a match is not found, the operation flow branches NO to send SDP query module 514.

If this is a first communication between the peer-to-peer bus daemons 406, 416 to establish peer-to-peer communications the initiating bus daemon 416 will not have saved a prior revision count or address and UUID for the accepting bus daemon 406. The operation flow will branch NO from revision test operation 512 to send SDP query module 514 performed by the initiating bus daemon 416.

Send SDP query module 514 sends a FIND NAME query to the accepting bus daemon 406, and this sets up a Bluetooth SDP query process to search for the applications available at the Bluetooth enabled device containing the accepting bus daemon 406. The SDP record for the accepting bus daemon 406 will list the names of applications available at the Bluetooth enabled device of accepting bus daemon 406. The initiating bus daemon 416 performs retrieve operation 516 to get the application name list at the accepting bus daemon 406, and the accepting bus daemon 406 sends the name list to the initiating bus daemon 416.

Same-name test operation 518, which may be performed by a same-name test module that is in communication with the initiating bus daemon 416, looks for a match between the name in the FIND NAME message 419 from client 418 and a name on the name list retrieved from the Bluetooth enabled device containing the accepting bus daemon 406. If there is no match, the operation flow passes to return connector 520, and the operation flow returns to the main program flow of the initiating bus daemon 416 until it discovers another Bluetooth enabled device with a peer-to-peer bus daemon. If there is a match between same-named applications, the operation flow branches YES to update Bluetooth record operation 522.

Update Bluetooth record operation 522 in the initiating bus daemon 416 updates the bus daemon record for the accepting bus daemon 406. The bus daemon record contains the list of application names just retrieved and also includes the bus daemon's address and UUID with its revision count. Notify operation 524 in the initiating-bus-daemon (e.g., bus daemon 416) notifies client 418 with FOUND NAME message 424 that the requested name in the FIND NAME message 419 has been found, and client 418 replies with a JOIN message 426 to the initiating bus daemon 416.

Peer-to-peer bus daemons 406 and 416 perform a handshake procedure with messages 428 and 430 to prepare for Bluetooth peer-to-peer communications. Once the peer-to-peer bus daemons 406, 416 are joined, establish module 528 opens peer-to-peer Bluetooth communication between server 402 and client 418 for the same-named applications. This peer-to-peer communication is managed by peer-to-peer bus daemons 406 and 416 using Bluetooth communication protocols.

The peer-to-peer communication continues until a user at one Bluetooth enabled device stops the communication by going to another application, moving out of RF range of Bluetooth transceivers, or turning off the Bluetooth enabled device. Any of these conditions will cause the close operation 530 in peer-to-peer bus daemons 406 and 416 to shut down the Bluetooth communications between the same-named applications available through the peer-to-peer bus daemons 406 and 416. The operation flow then returns to the main operation flow for the peer-to-peer bus daemons 406 and 416 through return connector 532.

When a user again wishes to reopen communication, the two peer-to-peer bus daemons 406 and 416 repeat operations 502 through 506 and modules 508 and 510 to find each other. In revision test operation 512, initiating bus daemon 416 compares present revision count, that is in the UUID of the EIR data packet just received from send EIR/UUID module 510 in the accepting bus daemon 406, with a previous revision count in a locally-stored cache by update Bluetooth record operation 522 during earlier peer-to-peer setup communication. If the revision counts are the same, the initiating bus daemon 416 knows the desired application is still available through the accepting bus daemon 406. Both peer-to-peer bus daemons 406 and 416 have the peer-to-peer bus daemon addresses from previous communication. The operation flow branches YES from revision test operation 512 to notify operation 524.

In another embodiment, revision test operation 512 compares the peer-to-peer bus daemon address and complete UUID of the accepting bus daemon 406 with previously cached information for the accepting bus daemon 406 during a prior update Bluetooth record operation 522. If there is an exact match, then the initiating bus daemon 416 uses the previously cached information for accepting bus daemon 406.

Notify operation 524 notifies the client 418 at the initiating bus daemon 416 that the same-named application has been found and is available through the accepting bus daemon 406. If the user wishes to join in peer-to-peer communication, the client 418 returns a join message 426 to the initiating bus daemon 416. Peer-to-peer bus daemons 406 and 416 perform a Bluetooth handshake procedure to prepare for Bluetooth peer-to-peer communications. Establish module 528 re-establishes peer-to-peer communication between the two same-named applications. All of the SDP query process for discovering the same-named applications has been skipped; thus substantially improving a user's experience.

The various embodiments and design alternatives described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A communication apparatus comprising:
   a Bluetooth transceiver configured to communicate with other Bluetooth-enabled devices;
   at least one application;
   a peer-to-peer bus daemon configured to communicate with the at least one application and exchange messages with other peer-to-peer bus daemons in the other Bluetooth-enabled devices via the Bluetooth transceiver;
   a version test module configured to compare a current version number of an application name list that is currently available from a particular remote peer-to-peer bus daemon residing on a particular remote Bluetooth-enabled device with a locally-stored cached version number received from the particular remote peer-to-peer bus daemon during a previous peer-to-peer communication;
   a service discovery module configured to exchange, responsive to the current version number being different than the cached version number, Bluetooth SDP messages with the particular remote Bluetooth-enabled device to discover application services available on the particular remote Bluetooth-enabled device;
   a same-name test module configured to detect a name match between the at least one application and applications available at the particular remote Bluetooth-enabled device; and
   an establish module configured to open peer-to-peer communications between the at least one application and another application on the particular remote Bluetooth-enabled device that has a same name as the at least one application when the same-name test module detects a name match or when the current version number and the cached version number are the same.

2. The communication apparatus of claim 1, wherein the service discovery module does not exchange Bluetooth SDP messages when the current version number is the same as the cached version number.

3. The communication apparatus of claim 1, wherein the application is configured to operate as a client and a sever application.

4. The communication apparatus of claim 3, wherein the application is selected from the group consisting of social, utility, and gaming applications.

5. The communication apparatus of claim 1, wherein the peer-to-peer bus daemon is configured to send a FOUND NAME message to the application if a same-name match is detected by the same-name test module.

6. A communication apparatus comprising:
   means for discovering peer-to-peer bus daemons in other Bluetooth-enabled devices;
   means for discovering applications at the other Bluetooth-enabled devices that are available through their peer-to-peer bus daemons without exchanging Bluetooth service discovery protocol (SDP) messages;
   means for detecting a name match between same-named applications available through the peer-to-peer bus daemons in the other Bluetooth-enabled devices; and
   means for opening peer-to-peer communications between same-named applications through peer-to-peer bus daemons on separate Bluetooth enabled computing systems.

7. The communication apparatus of claim 6 wherein the peer-to-peer bus daemons in the other Bluetooth-enabled devices are marked as Bluetooth discoverable and the communication apparatus includes:
   means for detecting the peer-to-peer bus daemons marked as Bluetooth discoverable and identifying the peer-to-peer bus daemons marked as Bluetooth discoverable with a universal unique identifier (UUID); and
   means for receiving an extended inquiry response containing a particular UUID for a particular accepting peer-to-peer bus daemon, the particular UUID including a current revision count indicating the current version of a name list of applications available through the particular accepting peer-to-peer bus daemon.

8. The communication apparatus of claim 7 further comprising:
   means for detecting whether the current revision count received in the particular UUID is the same as a previously stored revision count for the particular accepting peer-to-peer bus daemon; and
   the means for discovering applications includes means for exchanging Bluetooth SDP messages if the current revision count does not match the previously stored revision count.

9. The communication apparatus of claim 8 wherein said means for opening peer-to-peer communications between same-named applications includes means for opening peer-to-peer communications if the current revision count does not match the previously stored revision count.

10. A method for discovering application services available on Bluetooth enabled devices, the method comprising:
    receiving a Bluetooth message at an initiating Bluetooth enabled device from an accepting Bluetooth enabled device to discover an accepting-bus-daemon on the accepting Bluetooth enabled device, the Bluetooth message including a current universal unique identifier (UUID) identifying the accepting-bus-daemon;
    comparing the current UUID with a previous UUID that was previously sent by the accepting-bus-daemon to detect if the current UUID is the same as the previous UUID;
    exchanging Bluetooth SDP queries with the accepting Bluetooth enabled device to discover application services available through the accepting-bus-daemon if the current UUID is not the same as the previous UUID;
    detecting a name match between same-named applications on the initiating Bluetooth enabled device and the accepting Bluetooth enabled device; and
    opening peer-to-peer communications between the same-named applications on the initiating Bluetooth enabled device and the accepting Bluetooth enabled device.

11. The method of claim 10 wherein receiving the Bluetooth message includes:
    receiving the UUID in an extended inquiry response, the UUID containing a current revision count indicating a current version of a name list of applications available through the accepting-bus-daemon.

12. The method of claim 11 including:
    detecting whether the current revision count in the UUID is the same as a previously stored revision count that was previously stored at the initiating Bluetooth enabled device;
    if the current revision count is not the same as the previously stored revision count, initializing an SDP discovery process with SDP queries to discover application services available at the accepting-bus-daemon.

13. The method of claim 12 wherein if the current revision count is the same as the previously stored revision count, re-opening peer-to-peer communication with same-named applications available at the accepting-bus-daemon while bypassing the SDP discovery process.

14. The method of claim 11 wherein the UUID includes one hundred twenty eight bits with ninety-six bits being a base number identifying the accepting-bus-daemon and thirty two bits being the current revision count.

15. A non-transitory, tangible computer readable storage medium, encoded with processor readable instructions to perform a method for discovering application services available on Bluetooth enabled devices, the method comprising:
  receiving a Bluetooth message at an initiating Bluetooth enabled device from an accepting Bluetooth enabled device to discover an accepting-bus-daemon on the accepting Bluetooth enabled device, the Bluetooth message including a current universal unique identifier (UUID) identifying the accepting-bus-daemon;
  comparing the current UUID with a previous UUID that was previously sent by the accepting-bus-daemon to detect if the current UUID is the same as the previous UUID;
  exchanging Bluetooth SDP queries with the accepting Bluetooth enabled device to discover application services available through the accepting-bus-daemon if the current UUID is not the same as the previous UUID;
  detecting a name match between same-named applications on the initiating Bluetooth enabled device and the accepting Bluetooth enabled device; and
  opening peer-to-peer communications between the same-named applications on the initiating Bluetooth enabled device and the accepting Bluetooth enabled device.

16. The non-transitory, tangible computer readable storage medium of claim 15 wherein receiving the Bluetooth message includes:
  receiving the UUID in an extended inquiry response, the UUID containing a current revision count indicating a current version of a name list of applications available through the accepting-bus-daemon.

17. The non-transitory, tangible computer readable storage medium of claim 15, the method including:
  detecting whether the current revision count in the UUID is the same as a previously stored revision count that was previously stored at the initiating Bluetooth enabled device;
  if the current revision count is not the same as the previously stored revision count, initializing an SDP discovery process with SDP queries to discover application services available at the accepting-bus-daemon.

18. The non-transitory, tangible computer readable storage medium of claim 17, the method including re-opening peer-to-peer communication with same-named applications available at the accepting-bus-daemon while bypassing the SDP discovery process if the current revision count is the same as the previously stored revision count.

19. The non-transitory, tangible computer readable storage medium of claim 15 wherein the UUID includes one hundred twenty eight bits with ninety-six bits being a base number identifying the accepting-bus-daemon and thirty two bits being the current revision count.

* * * * *